United States Patent
Wu et al.

(10) Patent No.: US 7,449,867 B2
(45) Date of Patent: Nov. 11, 2008

(54) MULTI-PHASE BUCK CONVERTER WITH A PLURALITY OF COUPLED INDUCTORS

(75) Inventors: Wenkai Wu, East Greenwich, RI (US); Nai-chi Lee, Exeter, RI (US); George Schuellein, Narragansett, RI (US)

(73) Assignee: International Rectifier Corporation, El Segundo, CA (US)

( * ) Notice: Subject to any disclaimer, the term of this patent is extended or adjusted under 35 U.S.C. 154(b) by 237 days.

(21) Appl. No.: 11/459,179

(22) Filed: Jul. 21, 2006

(65) Prior Publication Data

US 2008/0019158 A1 Jan. 24, 2008

Related U.S. Application Data

(60) Provisional application No. 60/702,521, filed on Jul. 26, 2005.

(51) Int. Cl.
*G05F 1/59* (2006.01)
*G05F 1/62* (2006.01)

(52) U.S. Cl. ...................... 323/247; 323/272

(58) Field of Classification Search .................. 363/65; 323/225, 232, 247, 250, 268, 271, 272, 328, 323/350, 355
See application file for complete search history.

(56) References Cited

U.S. PATENT DOCUMENTS

| | | | | |
|---|---|---|---|---|
| 4,384,321 | A | * | 5/1983 | Rippel .................. 363/124 |
| 4,442,401 | A | * | 4/1984 | Jamieson ............. 323/351 |
| 4,713,742 | A | * | 12/1987 | Parsley ................ 363/124 |
| 6,084,790 | A | * | 7/2000 | Wong .................... 363/71 |
| 6,362,986 | B1 | | 3/2002 | Schultz et al. |
| 6,404,175 | B1 | * | 6/2002 | Yang et al. .......... 323/282 |
| 6,545,450 | B1 | * | 4/2003 | Ledenev et al. ..... 323/272 |
| 6,686,727 | B2 | * | 2/2004 | Ledenev et al. ..... 323/272 |
| 6,696,823 | B2 | * | 2/2004 | Ledenev et al. ..... 323/272 |
| 6,838,863 | B2 | * | 1/2005 | Hazucha et al. ..... 323/282 |
| 6,850,045 | B2 | * | 2/2005 | Muratov et al. ..... 323/272 |
| 7,176,662 | B2 | * | 2/2007 | Chandrasekaran .. 323/222 |
| 7,233,132 | B1 | * | 6/2007 | Dong et al. .......... 323/272 |
| 7,282,897 | B2 | * | 10/2007 | Moussaoui et al. .. 323/272 |
| 2004/0080965 | A1 | * | 4/2004 | Poon et al. .......... 363/125 |

* cited by examiner

*Primary Examiner*—Gary L Laxton (57) ABSTRACT

A multi-phase converter comprising 2N+1 inductors; and 2N+1 switching converters parallel connected and each including a switched node; wherein N is an even integer, a pair of said inductors are coupled and wound about a common core and each said coupled inductor is connected at one pole thereof to a respective switched node and at another pole thereof to an output node, and at least one of said inductors is uncoupled from the other inductors.

20 Claims, 7 Drawing Sheets

MULTI-PHASE BUCK CONVERTER WITH A PLURALITY OF COUPLED INDUCTORS

RELATED APPLICATION

This application is based on and claims the benefit of U.S. Provisional Application Ser. No. 60/702,521, filed on Jul. 26, 2005, entitled MULTI-PHASE BUCK CONVERTER DESIGN WITH 2 PHASE COUPLED INDUCTOR, to which a claim of priority is hereby made and the disclosure of which is incorporated by reference.

FIELD OF THE INVENTION

The present invention relates to power supply circuits and more particularly to multi-phase power converters.

BACKGROUND OF THE INVENTION

Figure 1A:
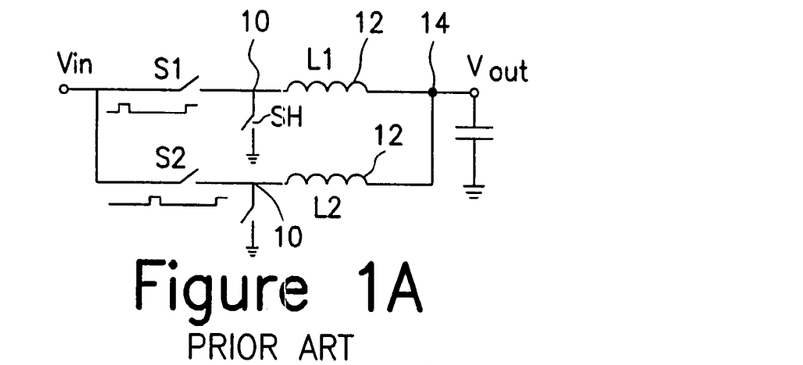
FIG. 1A illustrates a multi-phase converter according to the prior art.

Referring to FIG. 1A, a two-phase buck converter includes two parallel connected converters, each including a first control switch S1, S2 and a shunt switch SH connected to one another at a switched node 10. An inductor 12 is connected to each respective switched node 10 at one pole thereof and to an output node 14 at another pole thereof. Inductors 12 in FIG. 1A are not magnetically coupled to one another, i.e., they do not share a common core.

Figure 1B:
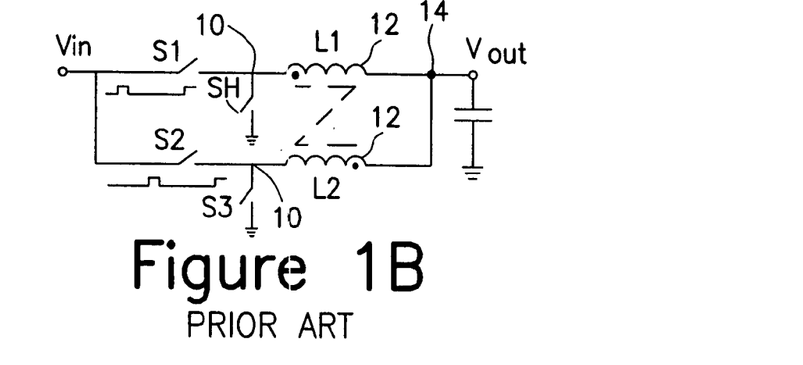
FIG. 1B illustrates a multi-phase converter according to the prior art.

FIG. 1B shows a two-phase buck converter in which inductors 12 are coupled to one another, which means that inductors 12 are inverse connected and wound about a common core.

It is known that current cancellation in a multi-phase voltage regulator such as a multi-phase buck converter can result in the reduction of ripple in the output current.

Figure 1C:
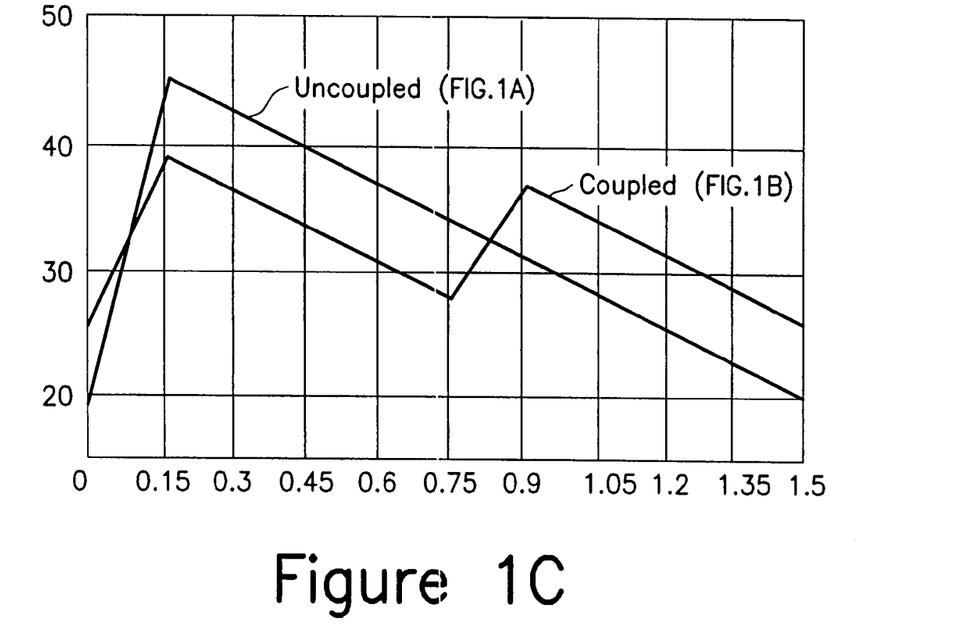
FIG. 1C graphically illustrates a comparison of the ripples current between the converter of FIG. 1A and the converter of FIG. 1B.

Current cancellation in a multi-phase buck converter can be extended to the inductors and the switches by multi-phase inductor coupling. For example, as illustrated in FIG. 1C, in a two-phase buck converter, implementing coupled inductors (FIG. 1B) can effectively reduce the peak to peak current that flows through the inductors. Thus, less steady state losses can be expected when coupled inductors are used without sacrificing dynamic performance. Moreover, compared to a multi-phase buck converter in which the inductors are not coupled (FIG. 1A), when the inductors are coupled, the size of the inductors can be reduced without inducing more ripple current. Thus, faster transient response can be expected without sacrificing converter efficiency.

A typical multi-phase converter according to the prior art can include more than two inductors wound around a common core. Such an arrangement is inherently asymmetrical meaning that its phases exhibit non-identical magnetic characteristics. The variation in the magnetic characteristics can lead to sub-harmonic output ripple.

It is desirable to reduce the sub-harmonic output ripple in a multi-phase converter.

SUMMARY OF THE INVENTION

It is an object of the present invention to provide a multi-phase converter which exhibits less tendency to produce sub-harmonic ripples in the output current thereof.

A power converter according to the present invention includes a plurality of parallel connected converters each series connected at the switched node thereof to a respective inductor, in which the converters are arranged such that each pair of converters are connected to a respective one of two inductors that are inverse connected and wound about a common core. Thus, a multi-phase converter according to the present invention includes at least one pair of parallel connected converters associated with a pair of coupled inductors or a plurality of pairs of parallel converters each pair being associated with a pair of coupled inductors.

An arrangement according to the present invention is advantageous in that a pair of coupled inductors are physically symmetrical and can be configured to exhibit identical magnetic characteristics, thereby reducing sub-harmonic ripple in the output current due to asymmetry.

In a voltage regulator, the phase number depends on the optimization tradeoffs of efficiency, cost, and so on. To increase the current rating, it is preferred to add more phases. The number of phases, however, is not always even. According to one aspect of the present invention, an odd number of parallel converters are provided in which at least one of the inductors is not coupled to the other inductors, while the other converters are arranged to have symmetrical magnetic properties as explained above.

For odd phase converters, proper phase shifting can eliminate the potential output ripple current. According to one aspect of the present invention, a phase shift scheme is implemented to reduce the ripple due to the presence of the non-coupled inductor.

Other features and advantages of the present invention will become apparent from the following description of the invention which refers to the accompanying drawings.

BRIEF DESCRIPTION OF THE DRAWINGS

FIGS. 5A-6C illustrate calculated waveforms for a four-phase converter and a five-phase converter respectively according to the present invention.

FIGS. 7A-8B illustrate simulated waveforms for a four-phase converter and a five-phase converter respectively according to the present invention.

DETAILED DESCRIPTION OF EMBODIMENTS OF THE INVENTION

Figure 2:
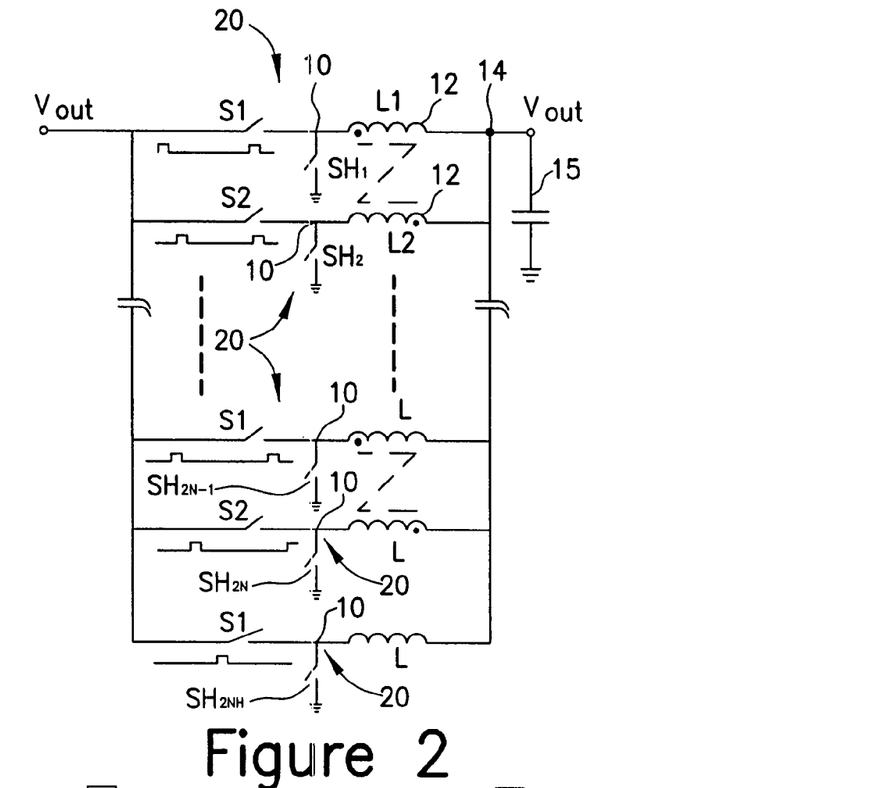
FIG. 2 illustrates a multi-phase buck converter according to the present invention.

Referring to FIG. 2, a multi-phase buck converter according to the preferred embodiment of the present invention includes a plurality of parallel connected converters 20. Each converter 20 preferably includes a control switch S1 to $S_{2N+1}$ connected between power input node Vin and switched node 14, and a shunt switch $SH_1$ to $SH_{2N+1}$ connected between respective switched node 10 and ground. A converter according to the present invention farther includes a plurality of inductors $L_1$ to $L_{2N+1}$ each connected at one pole thereof to a respective switched node 10 and at another pole thereof to output node 14 of the converter. Preferably, an output capacitor 15 is connected at one pole thereof to output node 15 and at another pole thereof to ground.

Preferably, the control switches are power MOSFETs, although other switches such as IGBTs may be used without deviating from the scope and the spirit of the present invention.

According to one aspect of the present invention, no more than a pair of inductors are coupled and wound about a common core and each such inductor is connected at one pole thereof to a respective switched node and at another pole thereof to an output node. For example, $L_1$ and $L_2$ are coupled and wound about a common core, and connected respectively to the switched node associated with control switches S1 and S2. Note that as referred to herein coupling of two inductors means that the inductors are inverse connected; i.e. anti-parallel connected.

Further, according to another aspect of the present invention, inductor $L_{2N+1}$ is not coupled with the other inductors. Thus, N number of coupled inductors (i.e. two phase converters with coupled inductors) are combined with a single uncoupled inductor to obtain a hybrid type of converter.

When N two-phase converters with coupled inductors are combined with at least one phase with a non-coupled inductor, benefits result from the magnetic coupling. In fact, when $L_{2N+1} \to \infty$, the converter will behave as a 2N phase converter.

Figure 3:
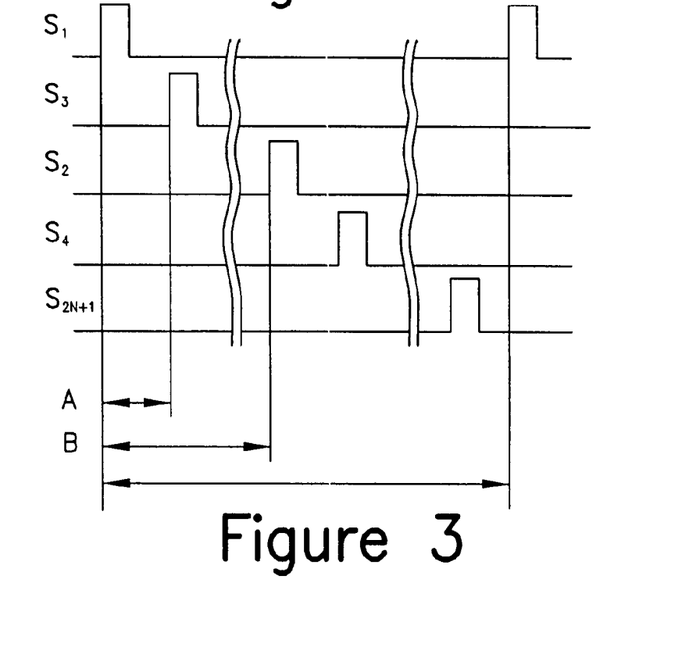
FIG. 3 illustrates graphically a control scheme for energizing the control switches of a converter according to the present invention.

Referring now to FIG. 3, in each switching cycle, each inductor $L_1$ to $L_{2N+1}$ is energized sequentially by turning on its associated control switch $S_1$ to $S_{2N+1}$. For example, $L_1$ is energized by turning on $S_1$, and so on.

According to one aspect of the present invention, unlike the prior art, the coupled inductors are not energized 180 degrees apart and all inductors are not energized 360/N degrees apart where N is the number of inductors. Rather, to obtain optimum results, the inductors are energized according to the following phase shifting scheme to eliminate the potential increased output ripple current due to the pressure of a non-coupled inductor.

i) Phase shift for the coupled two inductors is governed by the equation 1.

$$\phi(S_{2k-1}, S_{2k}) = \frac{360 \cdot N}{2 \cdot N + \frac{L_k}{L_{2N+1}}} \quad (1)$$

This phase shift is shown in FIG. 3 at A.

where $L_k$ is the leakage inductance of the coupled inductor, and where $L_{2k-1}$ and $L_{2k}$(k=1, 2 ... N), are the coupled inductor; i.e. the inverse connected inductors, and $S_{2k-1}$ and $S_{2k}$ represent respectively the control switches associated with the coupled inductors. For example, in a multi-phase converter that includes one converter having two phases associated with a coupled inductor pair (N=1), $S_1$, and $S_2$ would be connected respectively with $L_1$, and $L_2$ coupled inductors, while $S_3$ would be connected to $L_3$, the uncoupled inductor. Note that in the example three phases would be present in the converter.

ii) Phase shift for the adjacent two-phase converters except for the phase with uncoupled inductor is expressed by equation 2

$$\phi(S_{2k-1}, S_{2k+1}) = \frac{360}{2 \cdot N + \frac{L_k}{L_{2N+1}}} \quad (2)$$

This phase shift is shown in FIG. 3 at B.

With such an arrangement, the converter equivalent inductance is derived as equation 3.

$$L_{Eq} = \frac{1}{\frac{2 \cdot N}{L_k} + \frac{1}{L_{2N+1}}} \quad (3)$$

Peak to peak ripple current per phase for coupled inductor is given by equation 4.

$$\Delta I_{pp\_phase} = \frac{k - (2k-1)D}{(2k-1)L_k F_s} \cdot V_{out} \quad (4)$$

where Vout is the output voltage, D is the duty ratio, Fs is the switching frequency, and k is the magnetizing inductance over the leakage inductance ratio for the coupled inductor. The preferred inductance for the uncoupled inductor $L_{2N+1}$ is expressed in equation 5 to obtain the same peak to peak current among all the phases.

$$L_{2N+1} = \frac{(2k-1)(1-D)}{k - (2k-1)D} \cdot L_k \quad (5)$$

Converter output ripple current is derived in equation 6.

$$\Delta I_{pp\_converter} = \frac{1 - 2ND}{L_k F_s} \cdot V_{out} - \frac{V_{out}}{L_{2N+1} F_s} \quad (6)$$

DESIGN EXAMPLE

Figure 4:
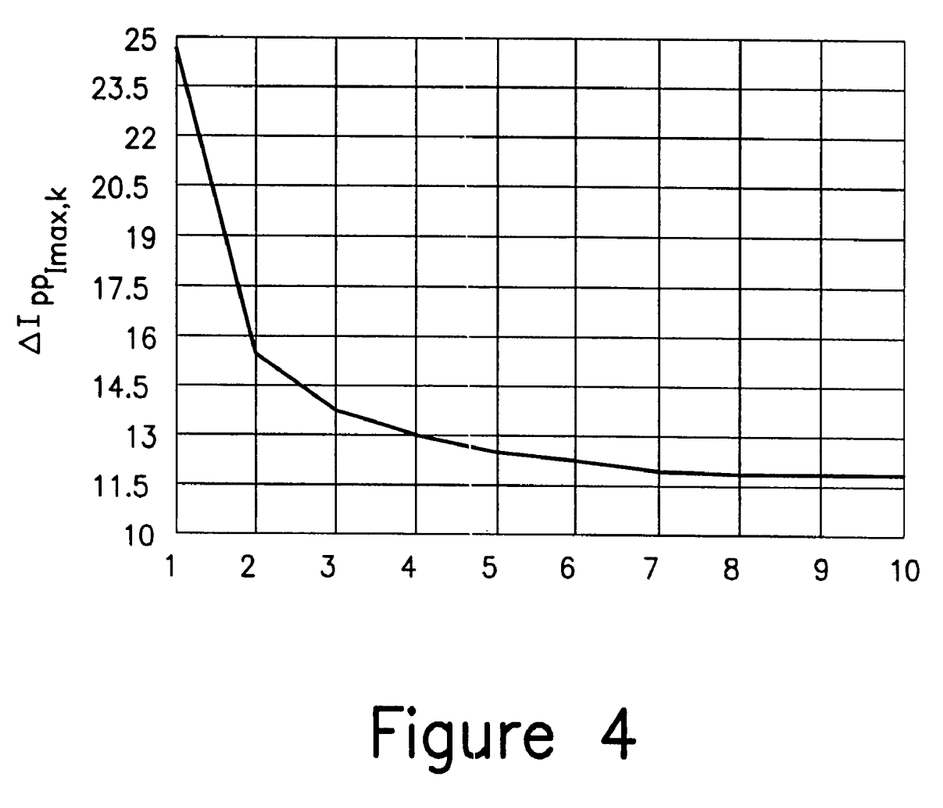
FIG. 4 graphically illustrates the ratio of magnetizing inductance to leakage inductance of coupled inductors (k) versus the value of current difference in the coupled inductors (delata I).

Design specification:
Vin/Vout_no_load=12V/1.335 V;
Load line Ro=1.25 mohm;
Maximum output current Imax=130 A;
Switching frequency $F_S$=660 KHz In this example, a four phase converter and a five phase converter are compared. To save on the output capacitors, 65 nH was selected as the leakage inductance for the coupled inductor. Regarding magnetizing inductance, it is known that higher magnetizing inductance gives stronger coupling and better current ripple cancellation. However, the higher magnetizing inductance, the easier to get saturation if there is a small DC current mismatch between the two coupled phases. From FIG. 4, selecting magnetizing inductance over leakage inductance ratio k=3 will make good use of coupling and give a good compromise between coupling and robustness against core saturation. For the five phase converter, based on equation 5, 120 nH commercial off the shelf (COTS) inductor was selected for the uncoupled inductor to have a close peak to peak ripple current among all the phases.

Figure 5A:
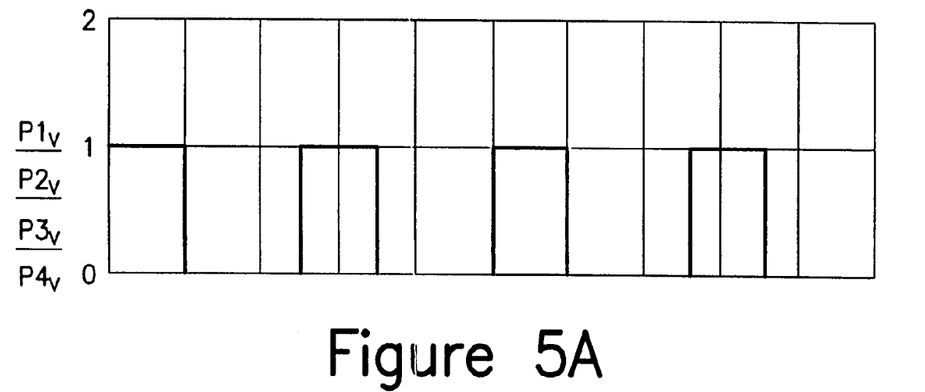
Figure 5B:
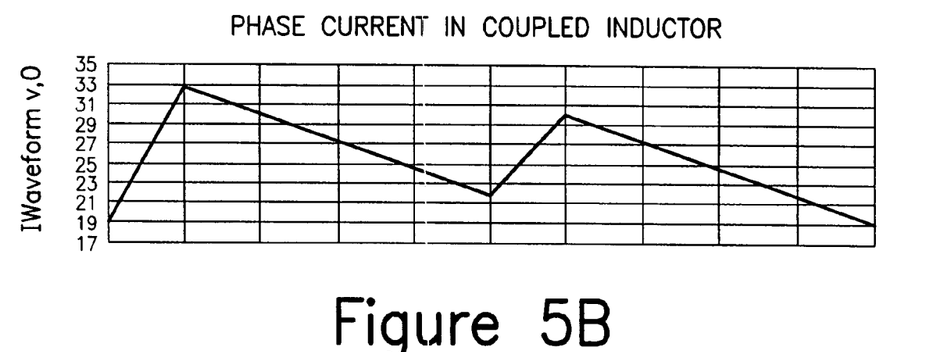
Figure 5C:
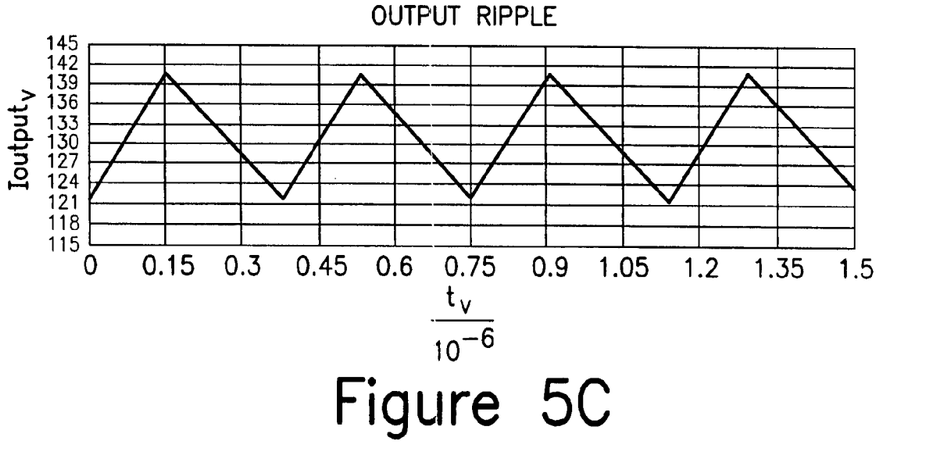
Figure 6A:
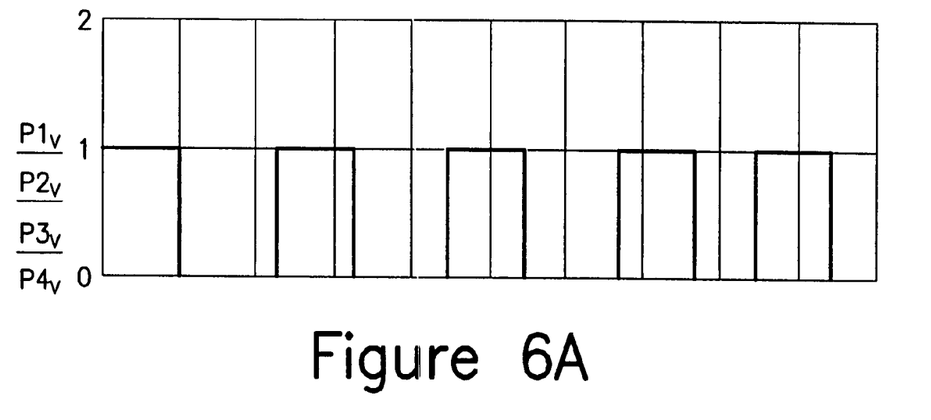
Figure 6B:
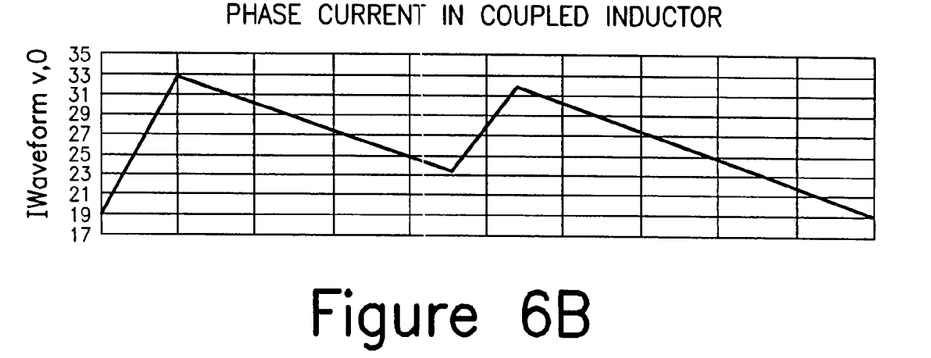
Figure 6C:
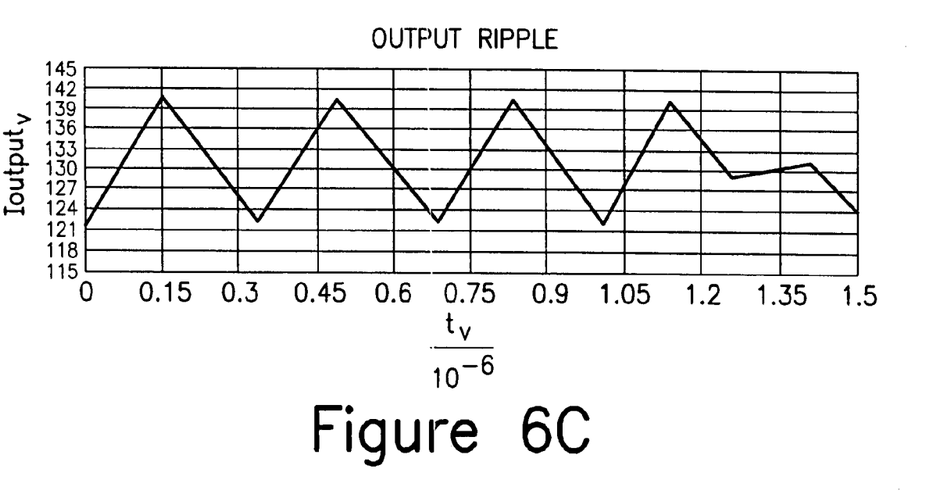
Figure 7A:
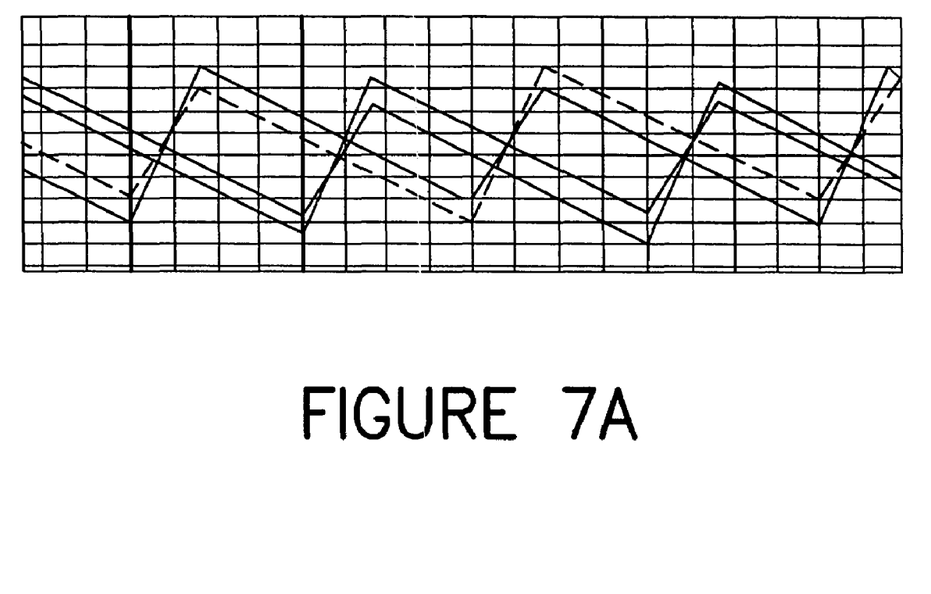
Figure 7B:
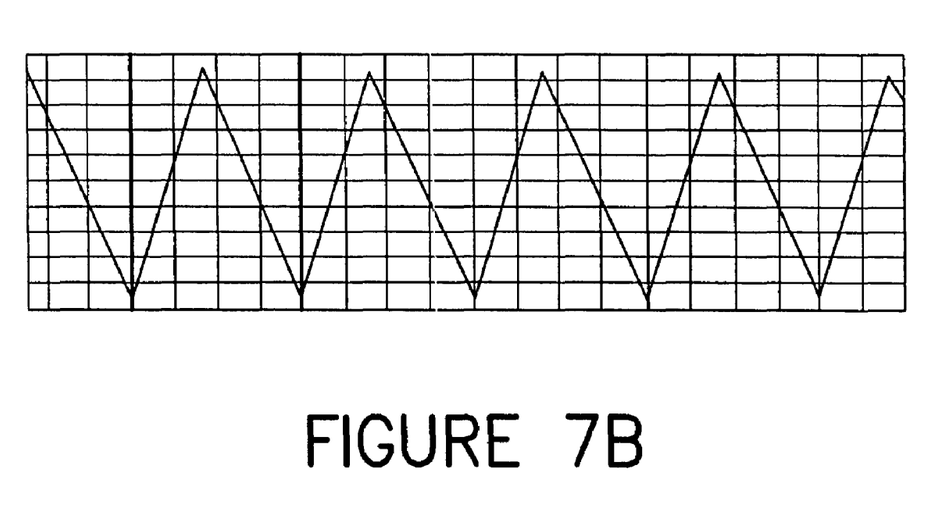
Figure 8A:
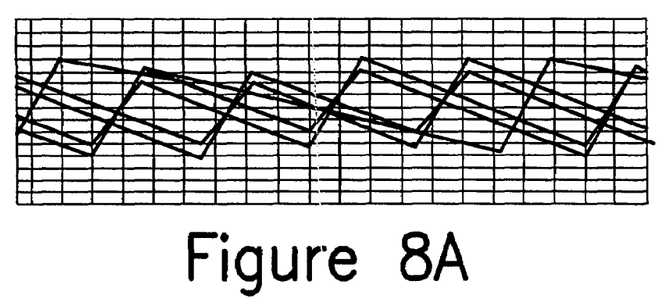
Figure 8B:
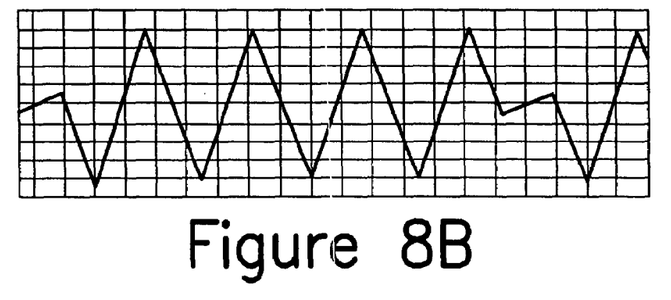

Calculated waveforms are presented in FIGS. 5A-5C (four-phase converter) and 6A-6C (five-phase converter), and simulated waveforms are shown in FIGS. 7A-7B (four-phase converter), and 8A-8B (five-phase converter). The waveforms indicate that ripple current in each phase has been reduced significantly.

EXPERIMENTAL RESULTS

Figure 9:
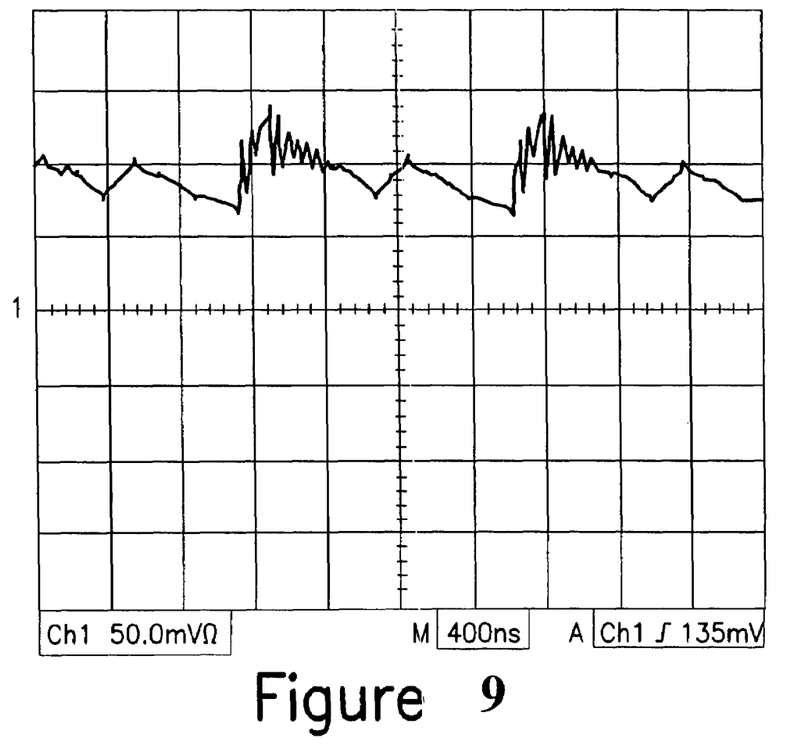
FIG. 9 illustrates a waveform obtain experimentally from a converter according to the present invention.

One four-phase converter designed with two two-phase converters with coupled inductors was built. The current waveform of the converter is shown in FIG. 9. The measured waveform proves that phase ripple current has been reduced significantly, as expected.

A converter according to the present invention can:
1. Decrease RMS current per phase to boost converter efficiency;
2. Reduce the converter equivalent inductance to minimize the required output capacitance for application with stringent transient requirements;
3. eliminate the harmonic output ripple current; and
4. eliminate the limitation for multi-phase converter design with two phase coupled inductors.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A multi-phase converter comprising:
   2N+1 inductors; and
   2N+1 switching converters parallel connected and each including a switched node;
   wherein N is an even integer, a pair of said inductors are coupled and wound about a common core and each said coupled inductor is connected at one pole thereof to a respective switched node and at another pole thereof to an output node, and at least one of said inductors is uncoupled from the other inductors.

2. The multi-phase converter of claim 1, wherein said converters are buck converters.

3. The multi-phase converter of claim 1, wherein each converter includes a control switch connected between a power input and said switched node and a shunt switch connected between said switched node and ground.

4. The multi-phase converter of claim 3, wherein said control switches and said shunt switches are power MOSFETs.

5. The multi-phase converter of claim 3, wherein said control switches and said shunt switches are power IGBTs.

6. The multi-phase converter of claim 1, wherein inductors are coupled in at least one pair and only in pairs by respective common cores.

7. The multi-phase converter of claim 6, wherein N is at least 4.

8. The multi-phase converter of claim 1, wherein said inductors are energized sequentially.

9. The multi-phase converter of claim 1, wherein N is the number of pairs of coupled inductors and said coupled inductors are energized with a phase angle shift governed by the following relationship:

$$\phi(S_{2k-1}, S_{2k}) = \frac{360 \cdot N}{2 \cdot N + \frac{L_k}{L_{2N+1}}}$$

wherein $\emptyset$ is the phase angle and $L_k$ is the leakage inductance of the coupled inductors.

10. The multi-phase converter of claim 1, wherein N is the number of coupled inductors and two adjacent pairs of coupled inductors are energized with a phase angle shift governed by the following relationship:

$$\phi(S_{2k-1}, S_{2k+1}) = \frac{360}{2 \cdot N + \frac{L_k}{L_{2N+1}}}$$

wherein $\emptyset$ is the phase angle and $L_k$ is the leakage inductance of the coupled inductors.

11. A multi-phase converter comprising:
   a plurality of inductors;
   a plurality of switching converters parallel connected and each including a switched node;
   wherein said inductors are coupled in at least one pair and only in pairs about respective common cores and each said coupled inductor is connected at one pole thereof to a respective switched node and at another pole thereof to an output node, and at least one of said inductors is uncoupled from the other inductors.

12. The multi-phase converter of claim 11, wherein there are 2N+1 inductors, and N is an even integer, and no more than one of said inductors is uncoupled.

13. The multi-phase converter of claim 11, wherein said converters are buck converters.

14. The multi-phase converter of claim 11, wherein each converter includes a control switch connected between a power input and said switched node and a shunt switch connected between said switched node and ground.

15. The multi-phase converter of claim 14, wherein said control switches and said shunt switches are power MOSFETs.

16. The multi-phase converter of claim 14, wherein said control switches and said shunt switches are power IGBTs.

17. The multi-phase converter of claim 11, wherein N is at least 4.

18. The multi-phase converter of claim 11, wherein said inductors are energized sequentially.

19. The multi-phase converter of claim 11, wherein N is the number of pairs of coupled inductors and said coupled inductors are energized with a phase angle shift governed by the following relationship:

$$\phi(S_{2k-1}, S_{2k}) = \frac{360 \cdot N}{2 \cdot N + \frac{L_k}{L_{2N+1}}}$$

wherein $\emptyset$ is the phase angle and $L_k$ is the leakage inductance of the coupled inductors.

20. The multi-phase converter of claim 11, wherein N is the number of coupled inductors and two adjacent pairs of coupled inductors are energized with a phase angle shift governed by the following relationship:

$$\phi(S_{2k-1}, S_{2k+1}) = \frac{360}{2 \cdot N + \frac{L_k}{L_{2N+1}}}$$

wherein said $\emptyset$ is the phase angle and $L_k$ is the leakage inductance of the coupled inductors.

* * * * *